(12) United States Patent
Phan et al.

(10) Patent No.: US 8,474,060 B2
(45) Date of Patent: Jun. 25, 2013

(54) SCANNING PROBE MICROSCOPE WITH COMPACT SCANNER

(75) Inventors: Nghi Phan, Santa Barbara, CA (US); Jeff Markakis, Santa Barbara, CA (US); Johannes Kindt, Heddesheim (DE); Carl Masser, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 13/068,052

(22) Filed: Apr. 29, 2011

(65) Prior Publication Data

US 2012/0278957 A1 Nov. 1, 2012

(51) Int. Cl.
  *G01Q 10/00* (2010.01)
(52) U.S. Cl.
  USPC ................ 850/1; 850/5; 850/21; 850/32
(58) Field of Classification Search
  USPC ................ 250/234; 850/6, 1, 21, 32
  See application file for complete search history.

(56) References Cited

U.S. PATENT DOCUMENTS

| | | | |
|---|---|---|---|
| 6,677,567 B2 * | 1/2004 | Hong et al. | 250/201.3 |
| 6,945,100 B2 * | 9/2005 | Kwon et al. | 73/105 |
| 6,951,129 B2 * | 10/2005 | Kwon et al. | 73/105 |
| 2002/0174716 A1 | 11/2002 | Ray | |
| 2003/0155481 A1 * | 8/2003 | Hong et al. | 250/201.3 |
| 2004/0140424 A1 * | 7/2004 | Kwon et al. | 250/234 |
| 2004/0140426 A1 * | 7/2004 | Kwon et al. | 250/234 |
| 2006/0272398 A1 | 12/2006 | Hwang et al. | |
| 2008/0223119 A1 | 9/2008 | Phan et al. | |
| 2011/0107471 A1 | 5/2011 | Masser | |

OTHER PUBLICATIONS

PCT Search Report for International Application No. PCT/US2012/035628 dated Nov. 14, 2012.

* cited by examiner

*Primary Examiner* — Nikita Wells
*Assistant Examiner* — Johnnie L Smith
(74) *Attorney, Agent, or Firm* — Boyle Fredrickson, S.C.

(57) ABSTRACT

A scanner for a scanning probe microscope (SPM) including a head has a scanner body that houses an actuator, and a sensor that detects scanner movement. The scanner body is removable from the head by hand and without the use of tools and has a total volume of less than about five (5) square inches. Provisions are made for insuring that movement of a probe device coupled to the scanner is restricted to be substantially only in the intended direction. A fundamental resonance frequency for the scanner can be greater than 10 kHz.

20 Claims, 10 Drawing Sheets

SCANNING PROBE MICROSCOPE WITH COMPACT SCANNER

BACKGROUND OF THE INVENTION

1. Field of the Invention

The preferred embodiments are directed to a high speed scanning probe microscope (SPM), and more particularly, a Z-scanner assembly for an SPM which is compact and lightweight, as well as readily removable from a head of the SPM to facilitate ease of use, while maintaining SPM performance, including fast scanning.

2. Discussion of the Prior Art

A scanning probe microscope, such as an atomic force microscope (AFM) operates by providing relative scanning movement between a measuring probe and a sample while measuring one or more properties of the sample. A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 coupled to the probe holder wedge (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26, such as a four quadrant photodetector. Note that the sensing light source of apparatus 25 is typically a laser, often a visible or infrared laser diode. The sensing light beam can also be generated by other light sources, for example a He—Ne or other laser source, a superluminescent diode (SLD), an LED, an optical fiber, or any other light source that can be focused to a small spot. As the beam translates across detector 26, appropriate signals are transmitted to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. For example, controller 20 is often used to maintain the oscillation amplitude at a setpoint value, $A_S$, to insure a generally constant force between the tip and sample. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM. Notably, scanner 24 often comprises a piezoelectric stack (often referred to herein as a "piezo stack") or piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Additionally, flexures are used to increase the stiffness of actuator in one or more axis, as described in copending application Ser. No. 11/687,304, filed Mar. 16, 2007, entitled "Fast-Scanning SPM Scanner and Method of Operating Same." Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

As the utility of SPM continues to develop, a need has arisen for imaging different types of samples at greater speeds to improve sample measurement throughput (e.g., more than 20 samples per hour) and/or measure nanoscale processes with higher time resolution than currently available. Although AFM imaging provides high spatial resolution (nanoscale), it has generally low temporal resolution. Typical high quality AFM images take several minutes to acquire, especially for scan sizes above a few microns.

Several factors can limit imaging speed, including the cantilever response time, the usable scanner bandwidth in X, Y and Z directions, the power and bandwidth of the high voltage amplifier that drives the scanner, the speed of the cantilever force sensing, as well as the demodulation system and the tracking force feedback system.

As with most measuring devices, AFMs often require a trade off between resolution and acquisition speed. That is, some currently available AFMs can scan a simple surface with sub-angstrom resolution. These scanners are capable of scanning only relatively small sample areas, and even then, at only relatively low scan rates. Traditional commercial AFMs usually require a total scan time typically taking several minutes to cover an area of several microns at high resolution (e.g. 512×512 pixels) and low tracking force. The practical limit of AFM scan speed is a result of the maximum speed at which the AFM can be scanned while maintaining a tracking force that is low enough not to damage or cause minimal damage to the tip and/or sample. Professor Toshio Ando at Kanazawa University in Japan has made tremendous progress with high-speed AFM using an AFM that scans mm-sized samples over small distances, typically less than 2 um. Professor Ando has achieved video scan rates with high resolution for this combination of small samples and small scan sizes.

Other systems, typically called "tip scanners," are known or have been proposed and/or implemented in which the probe is mounted on the scanner. One such system is incorporated in a line of instruments marketed by Veeco Instruments under the name Dimension®. That system employs a relatively massive tube scanner for the Z-actuator and has relatively low bandwidth. Another system is disclosed in U.S. Pat. No. 7,249,494 to Hwang. In the system of the Hwang application, the probe is mounted on an actuator that, in turn, is mounted on an optical objective that focuses incoming laser light. The objective, in turn, is mounted on an x-y actuator. However, because the objective and other optics of the system are fixed relative to the probe, relatively large probes (having a width of at least of 20 μm, length of more than 40 μm) are required to assure positioning of the focused laser beam on the cantilever. The typical probes used also have a resonant frequency $F_o$ of roughly 400 kHz and a quality factor Q of around 400. The resulting response bandwidth for these probes is of the order of $F_o/Q \approx 1$ kHz. Due in part to its low-bandwidth probe, the resulting system has a maximum scan rate of less than 30 Hz (or 30 scan lines per second), and more typical imaging speeds are around 1 Hz.

On the other hand, SPMs that can acquire data rapidly can also suffer unacceptable tradeoffs. One such system is marketed by Infinetisma under the name Video AFM™. The Video AFM operates at video rates but with significant compromises to signal-to-noise ratio and resulting image quality. The Infinitesima system also operates in contact mode with force feedback that is not fast enough to respond to variations in sample corrugation within a scan line. In this system, the sample or the probe is mounted on a tuning fork. The probe is driven into contact with the sample while the sample or the probe is scanned by vibrating the tuning fork at or near its resonant frequency. Because the tuning forks need to be quite small (typically on the order of a few mm in size) to achieve high resonant frequencies, they are very sensitive to being loaded by extra mass. As a result, only very small (on the order of a few mm in size) samples or cantilever substrates can be mounted to the tuning fork without degrading the performance.

It is known to combine an AFM with a conventional optical microscope to provide a view of the surface features of the sample. Notably, high performance microscope objectives have a short working distance and must be positioned close to the sample surface. High resolution optical imaging is therefore difficult to implement in combination with traditional AFM detectors because there is insufficient space between the bottom of the objective and the probe to accommodate the geometry for the incoming and outgoing detection beams. Because of the weight of the optical microscope, it is difficult to incorporate the optics of an optical microscope into the scanner of the AFM without unacceptably reducing the instrument's scan rate.

Some optical microscope-equipped SPMs have attempted to overcome this limitation by directing laser light through the microscope objective. One such system has been commercialized by Surface Imaging Systems under the name ULTRAOBJECTIVE™ and is disclosed in international publication number WO 01/23 939. In the ULTRAOBJECTIVE™ system, a near field AFM probe, a z actuator assembly for the probe and optical focusing system are provided in a single housing in order to provide an interchangeable objective that can be inserted in the objective turret of an optical microscope. Its objective is fixed relative to the probe, and it lacks any mechanism for dynamically focusing the laser beam onto the probe.

Another drawback of conventional optical microscope equipped AFMs is that the optical microscope is provided only to allow the user to inspect the sample. It plays no role in focusing the laser beam on the cantilever. Hence, even if the system were provided for focusing the light spot on the cantilever, no mechanism would be available to provide the user with optical feedback during a focusing process.

Solutions in this regard are available. However, two major drawbacks to maintaining a large first or fundamental resonant frequency for all moving components of an AFM include 1) the size and mass of the scanner and probe holder, and 2) the non-rigid coupling of these components to the AFM head, and each other.

As illustrated in FIGS. 2 and 3, a large probe holder 50 is often employed in conventional AFMs. In one type of AFM, a piezoelectric tube actuator is supported within an AFM head that supports coupling pins at its distal end to accommodate a probe holder such as probe holder 50. Probe holder includes a relatively massive body 52 with mounting apertures 62 formed therein to receive the mounting pins. A wedge 54 is provided on a surface of body 52 and configured to provide cantilever angle and support. An arm 58 is provided to hold the base of a probe device 56 supported by wedge 54. A screw 60 holds arm 58 to wedge 54. A user pushing on a back end of arm 58 operates to release the probe for installation, removal and replacement. Overall, this is a massive structure, which together with the scanner itself occupies a large volume (10s of cubic inches). This moving structure significantly limits the mechanical resonance of the AFM and thus AFM scanning speed.

Other AFM scanning solutions are available, but each has drawbacks as well. Even those that are capable of maintaining high fundamental resonance frequency often are unwieldy, and thus are difficult to use. In particular, picking up the relatively massive head and scanner, and turning it over and placing it so that probes may be mounted, removed and replaced is often a challenge. In this regard in particular, it is notable that the probe device is a consumable that often needs to be replaced on an hourly basis, and sometimes over much shorter time spans.

The field of scanning probe microscopy was thus in need of a scanner with improved rigidity and smaller mass and readily detachable to facilitate probe exchange. A smaller probe holder, having a higher first resonant frequency, was also desired. In the end, the scanner that facilitates easy of use and fast AFM operation would be ideal.

SUMMARY OF THE INVENTION

The present preferred embodiments facilitate fast AFM operation by minimizing the adverse affects on system resonant frequency due to massive scanning apparatus and probe holders. A compact, relatively lightweight Z-scanner is configured with a taper mount to be rigidly coupled to the AFM head. In addition, the Z-scanner with its mechanically rigid taper mount accommodates a compact probe holder design that provides further resonant frequency advantages. As a result, weak links in the system resonance chain due to use of large probe holders having a non-rigid connection to the AFM head/scanner are made more robust so AFMs employing the present technology are able to achieve scan speeds significantly greater than conventional AFMs. Moreover, what results is a scanner that is readily removable and thus very easy to use, including for typical AFM set-up operations such as probe installation. In fact, the ease and readiness of removing and installing the scanner is on par with the ease of unbuttoning a single shirt button using your fingers.

According to a first aspect of one embodiment, a scanner for a scanning probe microscope (SPM) including a head has a body housing, an actuator and a sensor that detects scanner movement. In this scanner, the body is removable from the head and has a total volume (excluding cable) of about 1 cubic inch.

According to yet another aspect of this embodiment, the scanner is a Z-scanner providing motion of a probe device coupled thereto substantially only in a direction orthogonal to a sample being scanned.

In a still further aspect of this embodiment, the scanner comprises a flexure diaphragm coupled between the actuator and the probe device. The flexure diaphragm restricts motion of the probe device laterally relative to the direction.

According to another aspect of this embodiment, a sensor substantially directly measures motion of the probe device in the direction. Preferably, the sensor is formed integrally with the body.

According to a still further aspect of this embodiment, the sensor includes a cantilevered element having fixed and free ends, and a link. The link is coupled to the free end of the cantilevered element, and an opposite end of the link is coupled to a probe holder supporting the probe device.

In another aspect of this embodiment, the body has a first open end for coupling the scanner to a free end portion of a head of the SPM. The free end portion of the head has an outer surface extending towards a sample. The body has a second closed end that supports a probe holder and an inner surface extending between the first and second ends. Preferably the outer surface and inner surface are similarly tapered so as to be mated to one another. An angle defined by the tapered surfaces is between about 15 degrees and 35 degrees and ideally, about 22°.

According to a still further aspect of this embodiment, a fundamental resonant frequency associated with the scanner is greater than 10 kHz. Ideally, the fundamental resonant frequency is greater than 40 kHz In yet another embodiment, a probe holder is rigidly coupled to the body. The inner surface includes an annular detent to accommodate a sealing element, an O-ring, disposed in a groove in the outer surface.

According to another aspect of this embodiment, the vacuum port in the free end portion applies a vacuum force to the body. The vacuum port is coupled to a vacuum orifice in the free end portion, which is connected to a vacuum orifice in the body.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

The preferred embodiments are directed to a high speed scanning probe microscope. In particular, an innovative Z-scanner design is combined with a compact probe holder integrated therewith that together enable samples scanning at speeds far exceeding those of conventional SPMs/AFMs. In particular, in contrast to prior art AFM's which are limited by comparatively large scanners/probe holders, having a lower resonance associated with the AFM's moving components about a couple kilohertz, the compact Z-scanner/probe holder design of the preferred embodiments substantially overcome system resonance constraints, allowing the AFM of the present invention to scan fast and maintain stability. AFMs employing the present technology are capable of maintaining a Z axis resonance of all moving components at over 50 kilohertz.

Figure 1:
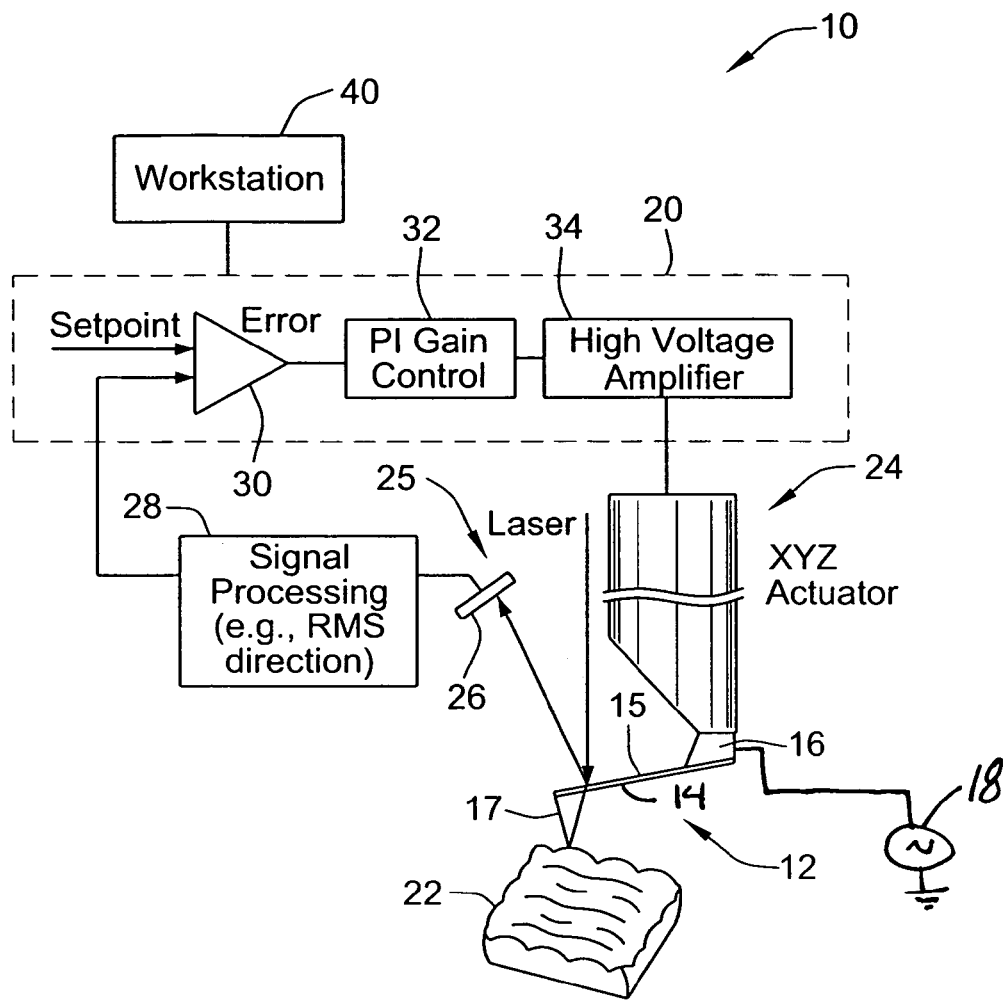
FIG. 1 is a schematic block drawing of a Prior Art atomic force microscope (AFM)
Figure 2:
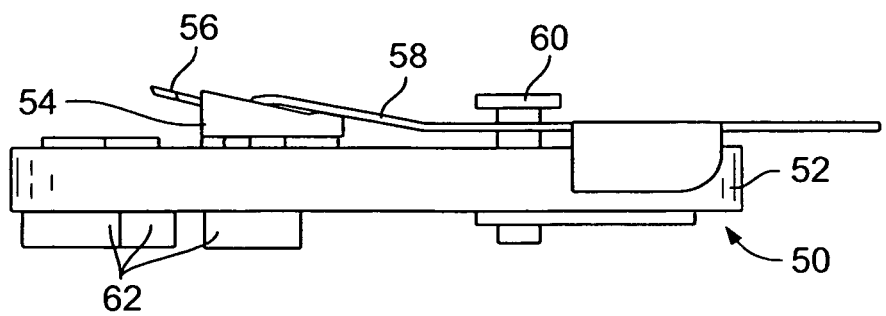
FIG. 2 is a side elevation view of a Prior Art probe holder for an atomic force microscope.
Figure 3:
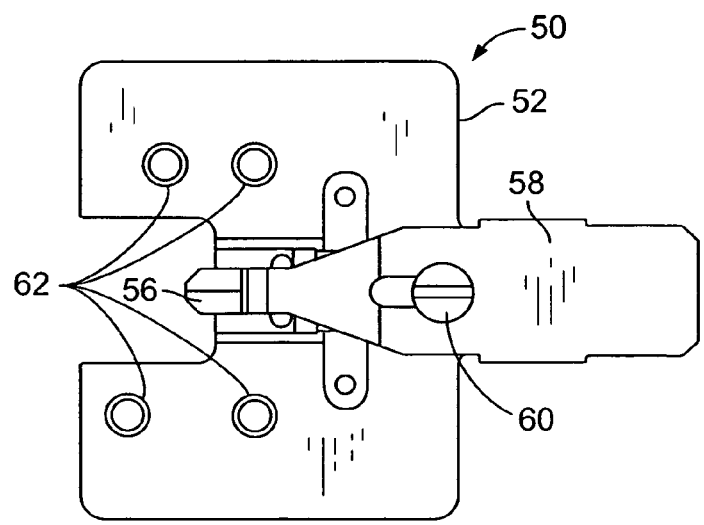
FIG. 3 is a top view of the Prior Art probe holder of FIG. 2.
Figure 4:
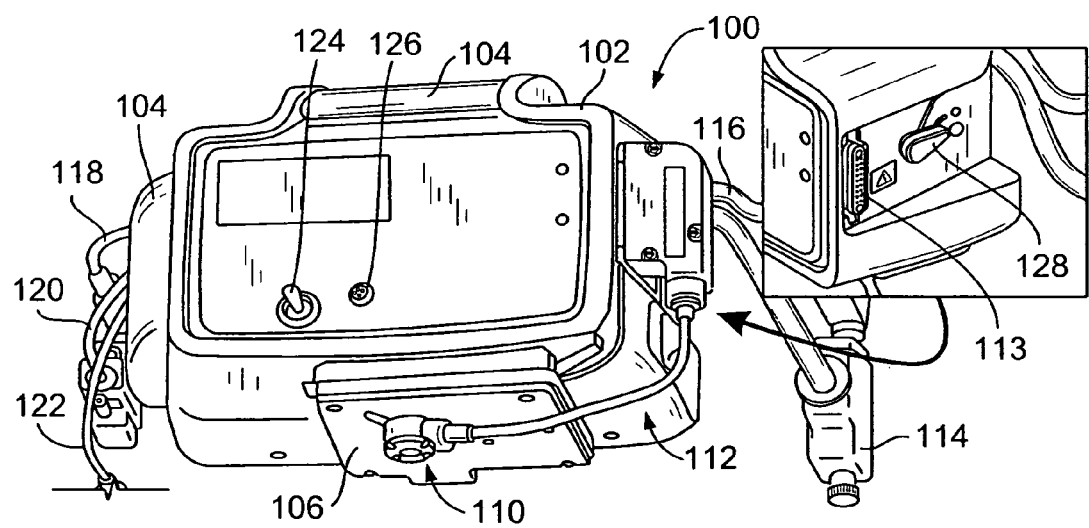
FIG. 4 is an isometric view of a fast scanning AFM head according to a preferred embodiment, illustrating the removable Z-scanner of a preferred embodiment.

Turning initially to FIG. 4, a fast scanning AFM head 100 includes a housing 102 formed with integrated handles 104 for ready transport of the AFM. Head 100 includes a bottom surface 106 from which extends a free end portion 107 that preferably houses optical and mechanical components (see FIG. 5), sometimes referred to herein as "housing 107", and is configured to accommodate a removable Z-scanner 110. As described in further detail below, the mounting of Z-scanner 110 on objective housing 107 yields significant advances in AFM performance. In particular, outer surface of the housing 107 is preferably tapered to accommodate a corresponding tapered surface of Z-scanner 110.

Z-scanner 110 also includes a corresponding cable and connector 112 for scanner control and communication with high speed AFM head 100. Fast scanning AFM head 100 also includes an AFM head connector cable 114 and a corresponding connector 116 for the laser and detector motor, as well as corresponding limit switches. Z-scanner cable 112 is coupled to head 100 at head connector 113 while a laser spot adjustment knob 128 is provided to position the laser on the back of the cantilever during AFM operation. Head 100 also includes a camera USB cable 118 and a connector 120 for controlling camera motors and corresponding light switches. In addition, vacuum tubing 122 is provided along with a Z-scanner vacuum switch 124 and a Z-scanner vacuum release 126, the functions of which will become apparent from the below description.

Figure 5:
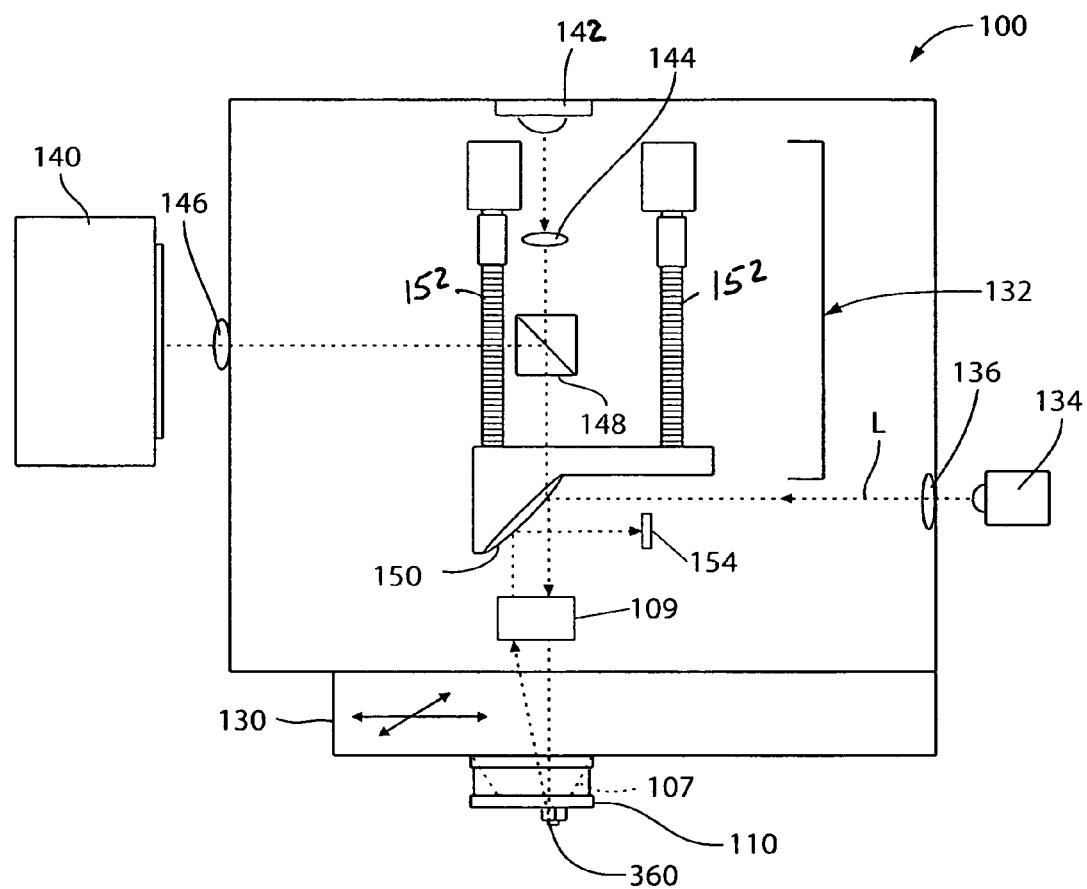
FIG. 5 is a schematic illustration of the components of the fast scanning AFM head of FIG. 4.

A schematic illustration of the components of AFM head 100 is provided in FIG. 5. Head 100 includes an XY-scanner 130 in a tip scanning AFM design, as well as a laser gimbal stage 132, a light source (laser) 134 and a corresponding objective lens 136. A detector stage 154 is also provided in head 100, as well as a camera 140.

To accommodate the optics, an illuminator 142 is provided that directs a beam towards a focusing lens 144 and further toward a free end portion or housing 107. Again free end portion 107 extends from a bottom surface 106 of housing 102 (see FIG. 4) and with the possibility to accommodate an objective lens 109. A focusing lens 146 is also provided in line with camera 140. An image of the sample can be obtained by camera 140 as the light is reflected from the sample to a beam splitter 148 and back toward camera 140. Laser gimbal stage 132 includes a mount for a dichroic mirror 150 for directing the laser beam toward the back of the probe and back toward a detector (reflected beam) for measuring changes in probe deflection, amplitude, frequency or phase. Gimbal stage 132 also includes adjustment screws 152 for positioning the beam "L" onto a back of a cantilever (not shown) of a probe device of the AFM.

Detector stage 154 of AFM head 100 includes a photo detector 154 for detecting changes in the position of the laser beam as the probe tip interacts with the surface.

Figure 6:
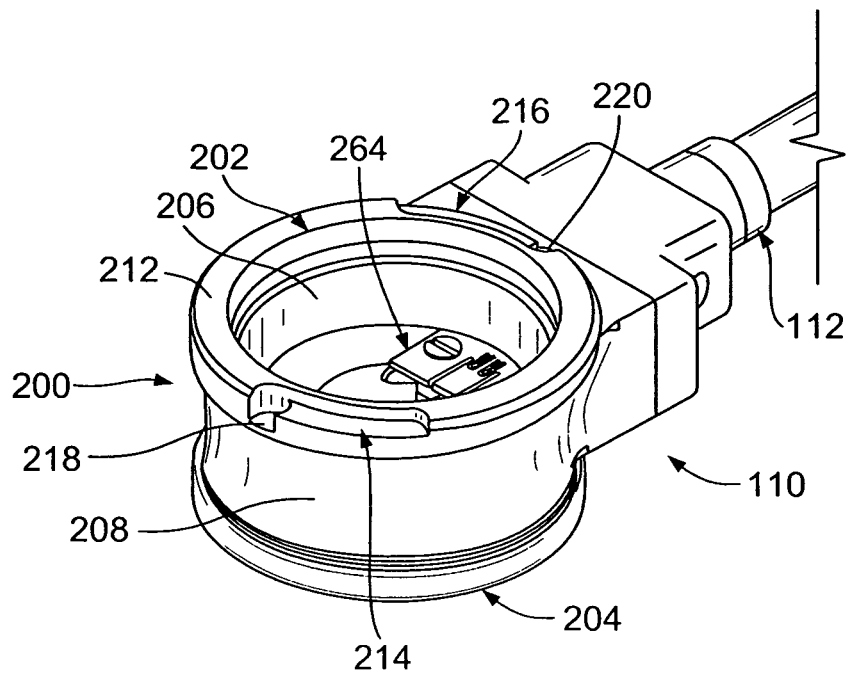
FIG. 6 is an isometric top view of a Z-scanner according to a preferred embodiment.
Figure 7:
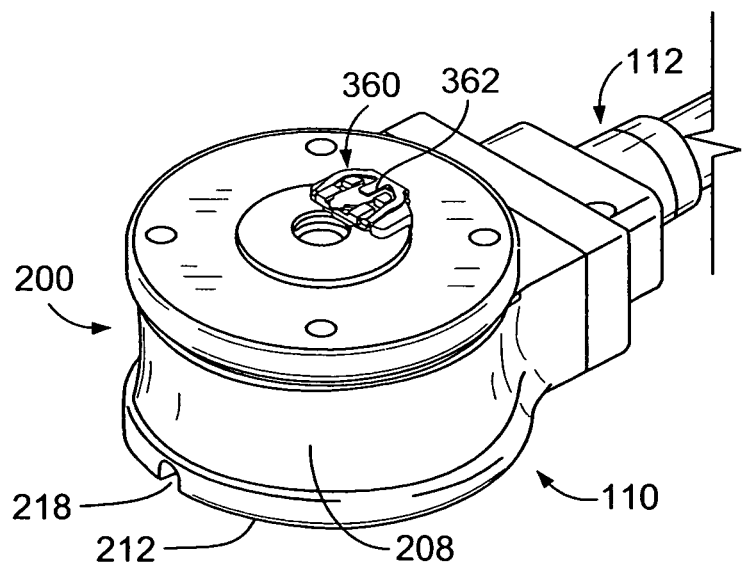
FIG. 7 is an isometric bottom view of the Z-scanner of FIG. 6.

Turning to FIGS. 6 and 7, Z-scanner 110 is shown in detail. Z-scanner 110 includes a scanner body (or, simply, body) 200 which essentially has a nozzle shape. Extending from scanner body 200 is scanner cable 112 which electronically connects scanner 110 to AFM head 100, thus providing control and communication between head 100 and scanner 110. Body 200 includes a first or top end 202 that is open and which configured to be rigidly coupled to AFM head 100 (FIG. 4), as described in further detail below. Opposite first end 202 is a second or bottom end 204 that is closed and hermetically sealed so that it may be introduced to varying environments, including fluid, while protecting the sensitive scanner components housed within body 200. A probe holder 360 is provided at second end 204. Probe holder 360 includes a retaining clip 362 for holding probe assemblies during AFM operation, described further below in connection with FIGS. 13-16, and is preferably formed integrally with second end 204.

Referring more specifically to FIG. 6, first end 202 includes a rim 212 that is formed with a pair of annular slots 214, 216, the slots extending a length along rim 212 and being disposed about 180 degrees from one another. Slots 214, 216 terminate in corresponding openings 218, 220 that are adapted to receive indexing pins 160 coupled to structure of head 100 (e.g., XY scanner) and extending downwardly from free end 107 (see FIG. 11, only one pin shown in the isometric view). When Z-scanner 110 is coupled to free end/objective housing 107, proper orientation of scanner 110, and correspondingly, the probe holder and probe(s) supported by scanner 110 is required. When coupling scanner 110 to housing 107 pins 160 ride in corresponding slots 214, 216 as the AFM user rotates Z-scanner until pins 160 engage openings 218, 220. When pins 160 drop in to openings 218, 220 the scanner is properly oriented and further rotation of the scanner is prevented. In this position, scanner 110 is rigidly mounted to head 100.

Figure 8:
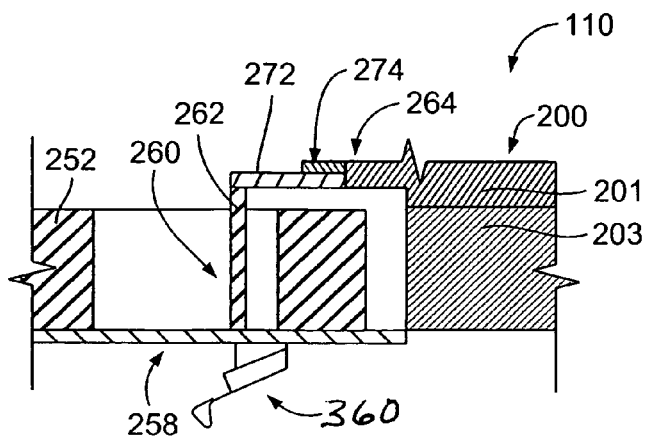
FIG. 8 is a schematic cross-sectional side view illustrating the scanner diaphragm and sensor.
Figure 9:
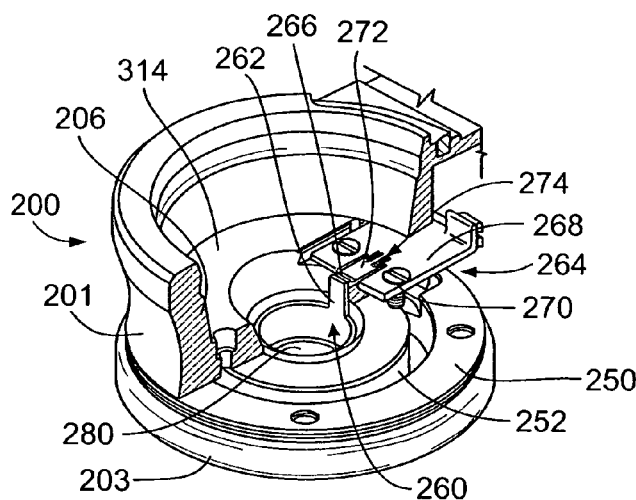
FIG. 9 is a partially broken away cross-sectional isometric view of the Z-scanner of FIG. 6.
Figure 10:
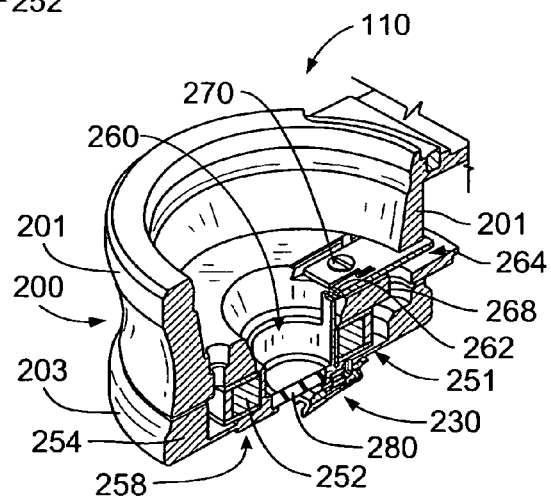
FIG. 10 is a partially broken away cross-sectional isometric view of the Z-scanner of FIG. 6.

Referring next to FIGS. 8, 9 and 10, the internal components of Z-scanner 110 including the Z-actuator and corresponding Z-sensor are shown. One challenge in creating a compact (small volume), reliable and repeatable scanner that maintains performance (high fundamental resonant frequency, for instance) and renders the apparatus easy to use, for example, removable/detachable and manipulatable for tasks like probe device replacement, is making sure that the scanner can maintain scanning motion in the intended direction, and insuring that probe motion can be accurately measured without compromising scanner performance. Detachment and reattachment operations assure that repositioning is accurate enough to readily align the cantilever of a probe device, with a range of microns. This is accomplished in the present preferred embodiments, as illustrated in the figures starting with schematic FIG. 8.

In FIG. 8, scanner 110 (e.g., a Z-scanner) includes a body 200 includes a first body portion 201 and a second body portion 203 that compactly houses, in this case, a Z-sensor 264. Also included is a diaphragm flexure 258 that extends along the bottom surface of scanner 110, and is coupled to second body portion 203 at the closed end thereof. A probe holder 360 extends from second body portion 203 and is coupled to diaphragm 258. More particularly, flexure diaphragm 258 is disposed between an actuator 252 (i.e., piezoelectric ring) and holder 360 to control and guide probe motion caused by actuator 252. Essentially, diaphragm 258 substantially insures that probe motion is maintained in the "Z" direction (orthogonal to sample) only. It does so by essentially removing lateral components of the motion provided by actuator 252 (which are inherent to the type of actuator required in this compact design) by restricting transmission of those lateral components to probe holder 360 coupled thereto, realized due to the substantial difference in the stiffness of the diaphragm in the lateral and vertical directions. Diaphragm is preferably made by machining (to appropriate specifications to achieve the discussed result) in to the scanner body. In addition, a hole or window 280 is disposed at the center of the diaphragm for laser and optical paths. As a result, the extremely accurate positioning of the tip required in high speed AFM operation is not compromised by Z-scanner motion. A preferred embodiment of the diaphragm is further depicted in FIG. 12 with more detail.

Referring further to FIG. 8, Z-scanner 110 also includes a sensor 264 formed integrally with body 200. Sensor 264 includes a substrate from which is made a diving board or cantilevered portion 272 that supports one or more strain gauge sensor elements 274 (resistive, for instance). The motion of the probe is monitored essentially directly by coupling a link 260 between diaphragm 258 at a location supporting probe holder 360 and a distal a distal end of diving board 272. As the probe moves in "Z", forces in the Z direction are transmitted to link 260 and then to diving board 272. As diving board deflects, sensor elements 274 operate to quantify the deflection and thus Z-motion of the probe. A highly reliable and accurate sensor 264 results, thus further facilitating fast AFM operation.

In sum, Z-scanner 110 is sufficiently compact to be removable from the AFM head 100, and manipulatable by the user for performing routine actions like repair and probe replacement. Scanner 110 is not only removable, it is able to achieve top performance (described further below) while occupying a minimum amount of AFM real estate, typically, occupying a volume less than about five cubic inches, and preferably less than about one cubic inch (excluding the cable).

In one particular embodiment, turning next to FIGS. 9 and 10, body 200 of Z-scanner 110 includes first body portion 201 that interfaces with a second body portion 203 via an interface ring 250, these components being welded (e.g., laser welded) or otherwise bonded similar to all seams of Z-scanner 110, thereby providing a fluid tight seal.

Z-scanner 110 also includes a Z-actuator 252 which is preferably a piezoelectric ring that interfaces with second body portion 203, portion 203 supporting probe holder 360 as shown. Particularly, as piezo ring 252 is excited, motion is transferred to probe holder 360 and thus the corresponding probes mounted therein follow the motion of actuator 252. Second body portion 203 includes an outer portion 254 that is coupled to a diaphragm flexure 258 that guides motion of the corresponding probes of the probe holder, as well as pre-loads the piezo ring 252 and seals the piezo ring assembly. Adjacent the interior of piezo ring 252 is a link 260 (cylinder) that includes an upwardly extending tab 262 that is coupled to a Z-sensor 264 via an interface 266. Z-sensor 264 detects movement of the probe tip, described below.

Interface 266 may be a laser weld, for instance. Because cylinder 260 and corresponding tab 262 move together with piezo ring 252, and piezo ring 252 probe holder 360 is coupled to piezo ring 252 probe supported by probe holder 360 in a Z direction is detected by Z-sensor 264. In other words, tab 262 follows probe motion as the Z-scanner is actuated.

Referring more specifically to sensor 264, sensor 264 includes a substrate 268 that is coupled to first body portion 201 of Z-scanner 110, preferably with screws 270. Substrate 268 of sensor 264 also includes an integral sensor diving board 272, the distal end of which couples to tab 262 via interface 266.

When piezo ring 252 is excited and caused to move the tip of the probe during operation, cylinder 260 moves therewith and that motion is translated to sensor diving board 272 via tab 262, causing diving board 272 to move in unison therewith. As it does, strain gauges 274, preferably arranged in a Wheatstone bridge configuration, sense the corresponding motion of the probe tip.

In sum, high resonant Z position sensor 264 compliments high resonant Z-actuator 110 to maximize the lowest resonance frequency of the moving components of the AFM. In doing so, sensor 264 accurately measures tip position at high bandwidth.

Notably, piezo ring 252 is sandwiched between scanner body 201 and diaphragm flexure 258 with a narrow 0.004 inch gap between body 201 and diaphragm flexure 258. Screws are preferably used to close this gap even further and attach the diaphragm flexure to the body 201. The gap is then permanently sealed by, preferably, laser welding. When the gap is closed, the piezo ring 252 is in compression at all times. This force also keeps the piezo ring 252 from moving from side-to-side. Again diaphragm flexure 258 includes a cylindrical ring 260 at its center, ring 260 accommodating tab 262 that interfaces with sensor 264. In addition, probe holder 360 is bonded on one end of the cylinder 260. On the opposite end, flexure tab 262 is machined into the cylinder wall. Again tab 262 is laser welded, preferably, to a free end of diving board sensor 272. Preferably, four strain gauges 274 are bonded at a fixed end (substrate 268) of diving board 274 to form the Wheatstone bridge.

In operation, piezo ring 252, when excited, pushes cylindrical ring 260 at the center of flexure diaphragm 258 and thus moves the cantilever and corresponding tip to track the sample surface in response to appropriate signals concerning the interaction between the tip and the sample. The flexure tab 262 at the opposite end of the cylindrical ring 260 moves in unison with the tip. This motion of the tab 262 deflects diving board 272 and generates strain at its fixed end. The strain gauges 274 measure the strain which is proportional to the position of the cantilever tip. Notably, contrary to known systems which use strain gauges to measure actuator motion, strain gauges 274 are not attached to the side wall of the piezo ring 252. Such an arrangement is known to lack performance in terms of accuracy, repeatability and also can suffer from hysteresis and creep that operate to compromise position measurements. Sensor 264 is formed integrally with body 200 of Z-scanner 110, and does not suffer the same drawbacks.

Figure 11:
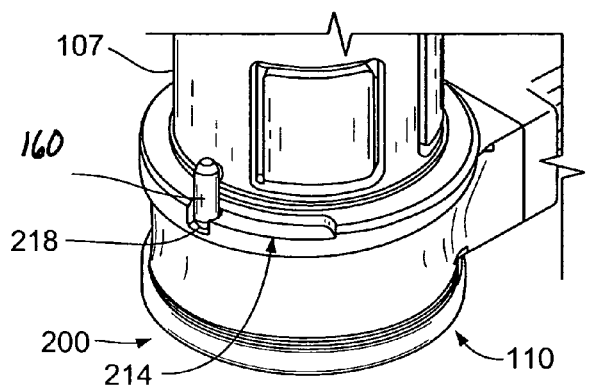
FIG. 11 is a partially broken away isometric view of the Z-scanner of FIG. 6 coupled to a downwardly extending free end portion of the scanner head of FIG. 4.

Turning next to FIGS. 11 through 13A, the rigid coupling between Z-scanner 110 and the fast scanning AFM head 100 is shown in more detail. Referring initially to FIG. 11, Z-scanner 110 is coupled to a free end portion 107 of scanner head 100. Objective housing 107 and the alignment pin 160 are both attached to the XY-scanner (not shown) housed within the head 100. To properly align Z-scanner 110 to objective housing 107, pins 160 engage Z-scanner 110 at openings formed in rim 212 of the top surface of Z-scanner body 200, as described previously. This coupling of the Z-scanner 110 to objective housing 107 prevents the Z-scanner from rotating on the taper mount when secured. Importantly, this attachment scheme allows Z-scanner 110 to be attached and removed from the head by hand and without using tools, while maintaining accurate positioning.

Figure 12:
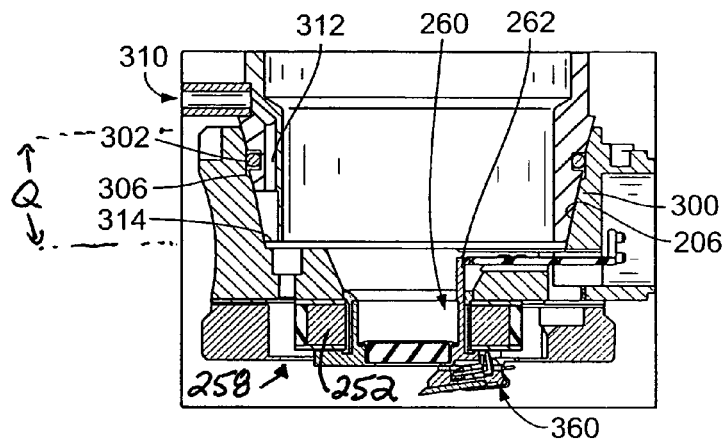
FIG. 12 is a cross-sectional view of the Z-scanner coupled to the downwardly extending free end portion of the AFM head shown in FIG. 11.
Figure 12A:
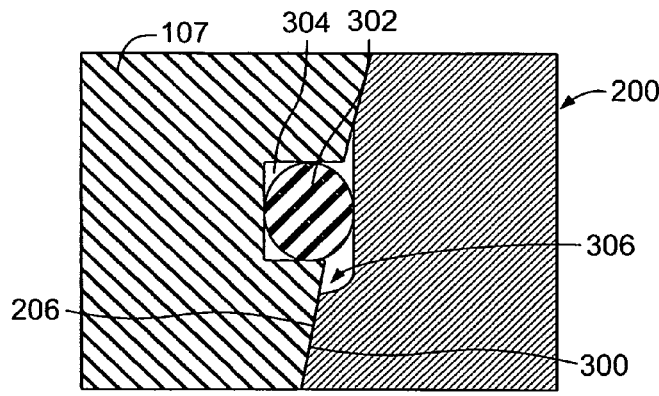
FIG. 12A is an enlarged cross-sectional view of the probe holder coupled to the Z-scanner of FIG. 12.

FIG. 12 illustrates the tapered mount between Z-scanner 110 and the scanner head 100 in more detail. In particular, inner surface 206 of body 200 of Z-scanner 110 is tapered and substantially symmetrical about its central axis so as to interface with the corresponding tapered surface 300 of objective housing 107. More particularly, these mated tapered surfaces 206 and 300 include a female taper on Z-scanner body 200 and a male taper on housing 107. The objective is sealed along the bottom lens. An O-ring 302 forms a seal around the tapered surfaces as follows. As the Z-scanner 110 is coupled to housing 107, O-ring 302 disposed in annular groove 304 of objective housing 107 slides along a detent 306 formed in inner tapered surface 300 of Z-scanner body 200. Detent 306 is configured to accommodate O-ring 302 and provide sealing engagement between housing 107 and scanner 110. The detail of this interface is shown in FIG. 12A. As Z-scanner 110 is pushed onto objective housing 107, the O-ring slides into detent 306 machined into Z-scanner tapered surface 300. Preferably, the surface of detent 306 has about a 2° tilt which prevents Z-scanner 110 from sliding off the tapered surface of objective housing 107, even without applying external forces to hold the two together.

Although the O-ring and detent arrangement work to couple and hold the components together, Z-scanner 110 is preferably held on objective housing 107 using vacuum force.

In particular, vacuum force is used to rigidly secure Z-scanner 110 to objective housing 107. A vacuum port 310 is coupled to a vacuum source (not shown) and operates to exert vacuum force on Z-scanner 110. More particularly, vacuum port 310 interfaces with a vacuum orifice 312 machined in objective housing 107 pulling on a cavity defined by surfaces 313 and 314 of the interior of Z-scanner 110.

Vacuum port 310 is coupled to a vacuum switch 124 and pump using appropriate tubing 122, illustrated in FIG. 4. When vacuum is applied, the differential pressure inside the corresponding cavity and ambient atmosphere generates a force that secures Z-scanner 110 to objective housing 107.

In sum, compact Z-scanner 110 is removable and is able to interface with the fast scanning AFM head 100 while maintaining sealing engagement thereto. The objective is sealed around the bottom lens. And, the O-ring 302 forms a seal around the tapered surfaces 206, 300 such that all Z-scanner openings are air-tight. As a result, an air-tight cavity between the objective housing 107 and Z-scanner 110 is maintained.

Again, in reference to diaphragm 258, the symmetric diaphragm flexure, in the shape of a ring, inside the ring actuator 252 assures symmetric motion. In addition, flexure 258 operates to decouple XY motion via substantially higher stiffness of the diaphragm ring in response to lateral motion.

Figure 13:
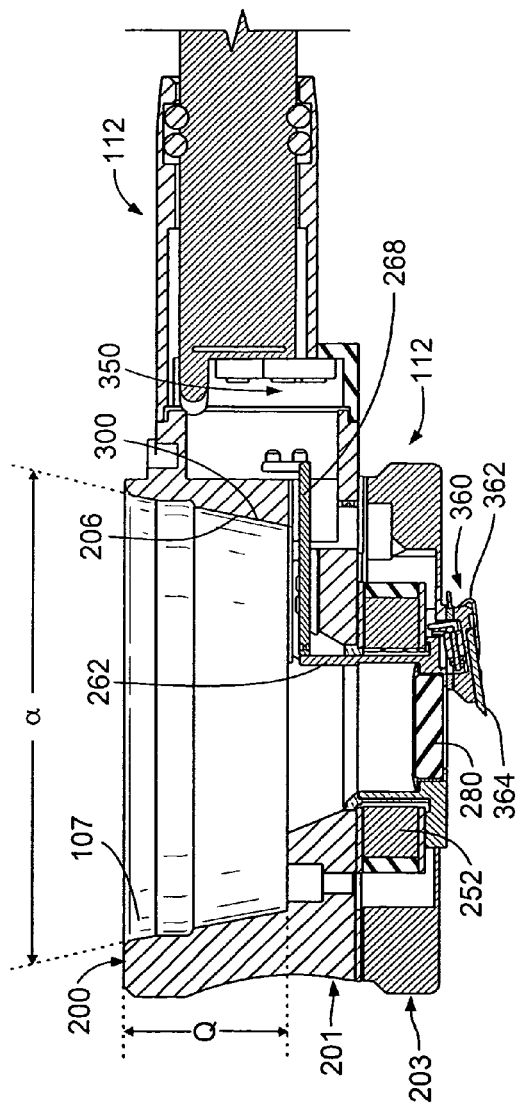
FIG. 13 is a cross-sectional view of the Z-scanner and free end of the AFM head shown in FIG. 11.
Figure 13A:
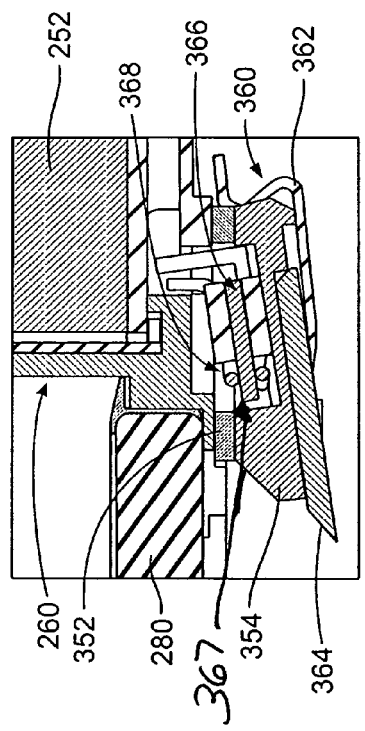
FIG. 13A is an enlarged cross-sectional view of the interface between the Z-scanner and free end shown in FIG. 13, illustrating an annular detent in the Z-scanner which accommodates an o-ring coupled to the free end.

Turning to FIGS. 13 and 13A, more detail of Z-scanner 110 and corresponding cable 112 is illustrated, along with further detail concerning probe holder 360 bonded to Z-scanner 110. In particular, cable 112 is coupled to Z-scanner 110 with an interconnect PCB 350 disposed between the two for communication between Z-scanner 110 and fast scanning AFM head 100. The probe holder mount is shown in more detail in FIG. 13A. An insulator 352 is bonded to a bottom surface of second body portion 203 of body 200 of Z-scanner 110. A wedge 354 is further bonded to insulator and provides a selected amount of tilt for a probe device held by the probe holder. A probe clip 362 is formed integrally with probe holder 360, clip 362 operating to hold probes 364 against wedge 354. Notably, a tapping piezo electric assembly 366 is formed in a cavity 367 formed in wedge 354. Appropriate wiring 368 is provided to excite tapping piezo electric assembly 366. Because probe holder 360 is formed integrally with the scanner 110, a rigid structure is provided having significantly greater resonance than conventional AFMs.

Overall, referring again to FIG. 13, the Z-scanner mount and compact probe holder design of the preferred embodiments significantly improve what was a significant limitation on system resonance. Rather than some known systems which utilize a mechanically non-rigid coupling between probe holder and scanner (e.g., pins extending downwardly from a piezoelectric tube into probe holder openings), in the present preferred embodiments, the tapered surfaces 206 and 300 of objective housing 107 and Z-scanner 110, respectively, provide a rigid mechanical connection between the two. This rigid coupling is provided by maintaining significant surface area of Z-scanner 110 in direct contact with an outer surface of free end portion 107. As shown in FIG. 12, the length "Q" of the cylindrical interface between the two structures is substantial, providing large surface area of contact between the two components, thus yielding a very rigid structure. This facilitates high resonance capability.

Preferably, a angle of taper, a is preferably between about 15° and 35°, and ideally about 22°, is employed. The actual amount of taper in the arrangement is a trade-off between ease-of-use and position repeatability of Z-scanner 110. If the angle is much smaller than 22°, the scanner 110 cannot be readily removed by hand and without the use of tools. If, on the other hand, an angle much larger than 22° is employed, scanner position on the taper will not likely be as accurate and repeatable.

Figure 14:
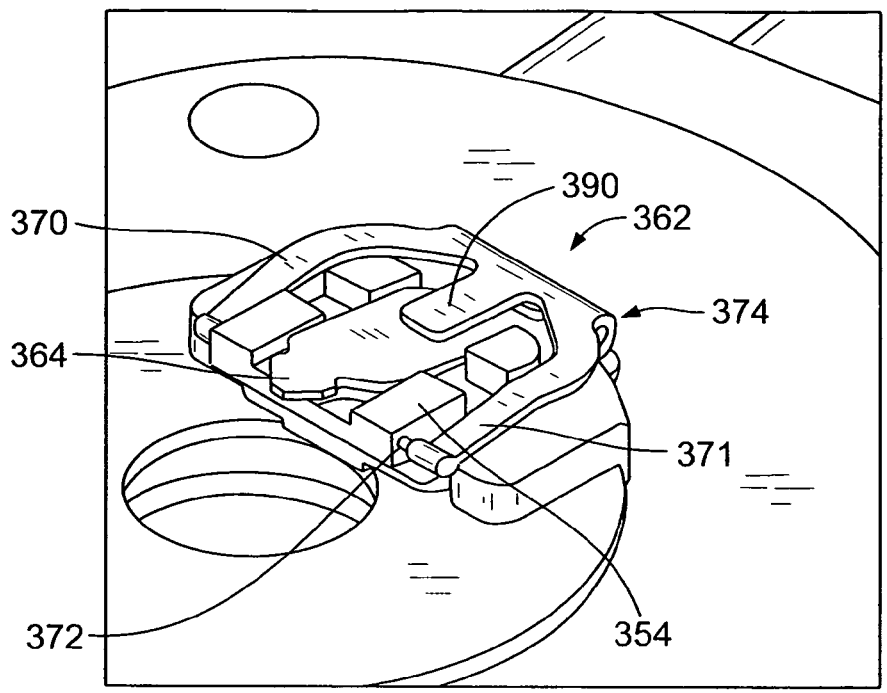
FIG. 14 is a broken away perspective view of a probe holder according to a preferred embodiment, illustrating a probe clip of a preferred embodiment.
Figure 15:
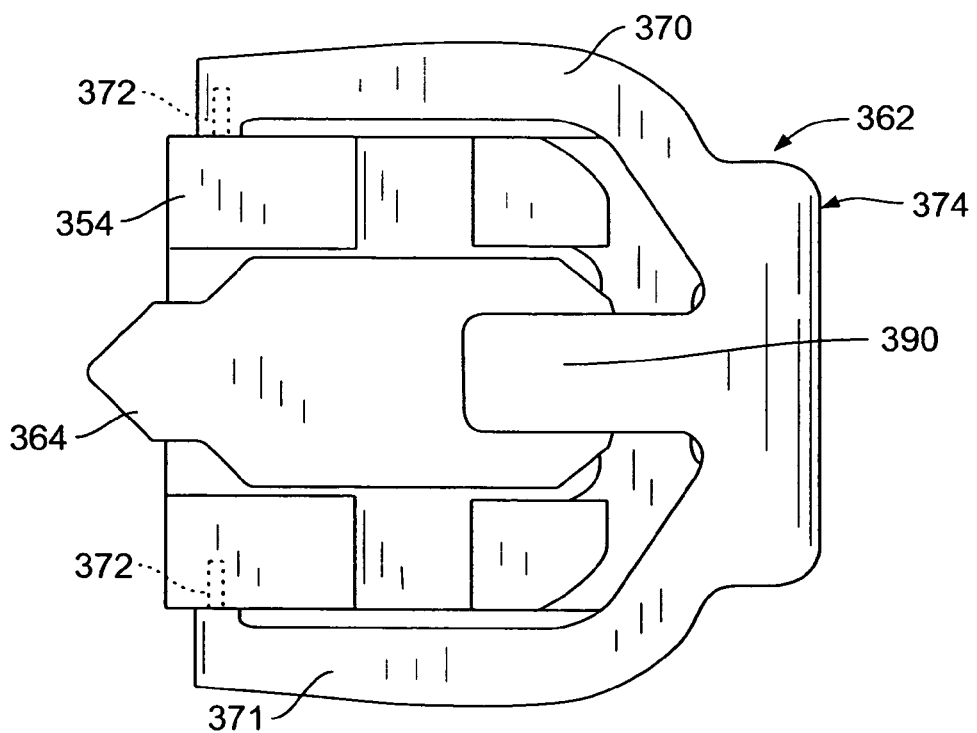
FIG. 15 is a top plan view of the probe holder and probe clip of FIG. 14.
Figure 16:
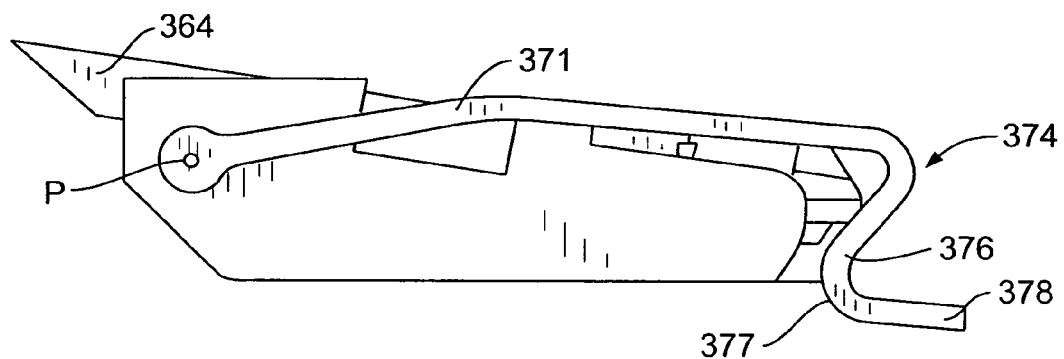
FIG. 16 is a side elevation view of the probe holder and probe clip shown in FIGS. 14 and 15.
Figure 17:
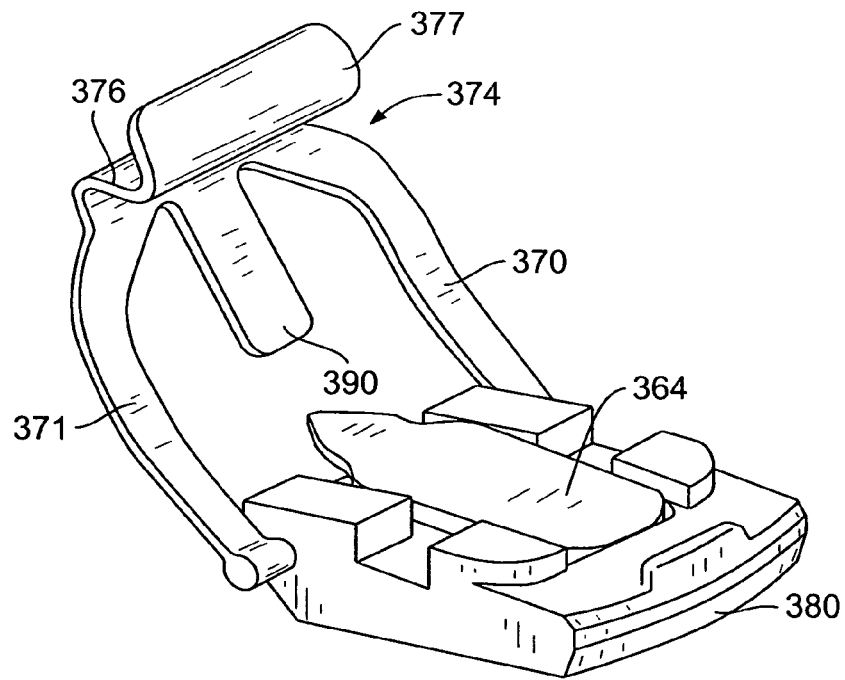
FIG. 17 is an isometric view of the probe holder and probe clip of FIG. 15, illustrating the probe clip in an open position.

Further enhancing high speed operation, the compact design of probe holder 360 rigidly coupled to Z-scanner 110 further improves system resonance. FIGS. 14-17 illustrate this compact and lightweight probe holder 360. Referring more specifically to FIG. 13, wedge 354 is bonded to insulator 352 which is, in turn, bonded to a bottom surface of Z-scanner 110. Referring now to FIG. 14, wedge 354 is machined to accommodate a clip 362 that is used to retain probe devices within wedge 354 during operation. Clip 362 includes arms 370, 371 that are coupled to wedge via pins 372 rotatable relative thereto. Clip 362 rotates relative to wedge 354 so that the clip can be opened for insertion of a probe 364 into wedge 354, and closed to retain probe 364 against the wedge. More particularly, clip 362 includes a tab 390 that is configured to sandwich the base of a probe 364 (placed in a cavity formed in wedge 354) when the clip 362 is closed. Clip 362 is closed by rotating the same at a point "P" defined by pins 372, and is retained in a closed position by spring portion 374.

Spring portion 374 includes a pliable backwards "S" shaped component 376 that flexes when a surface 377 of component 376 interfaces with an edge 380 of wedge 354. Edge 380 is curved so that as component 376 slides against edge 380 it flexes outwardly and then allows portion 374 to spring back towards the wedge to hold clip 362 against wedge 354. In its closed position, tab 390 holds probe 364 against wedge 354. The result is an extremely compact and rigid probe holder design that removes yet another limitation to maintaining AFM system resonance as high as possible. Overall, it is the combination of the mechanical wedge bonded to the scanner and configured to accommodate compact clip 362 that enables achieving a significant improvement in lowest first resonance. High speed scanning is thereby realized.

Figure 18:
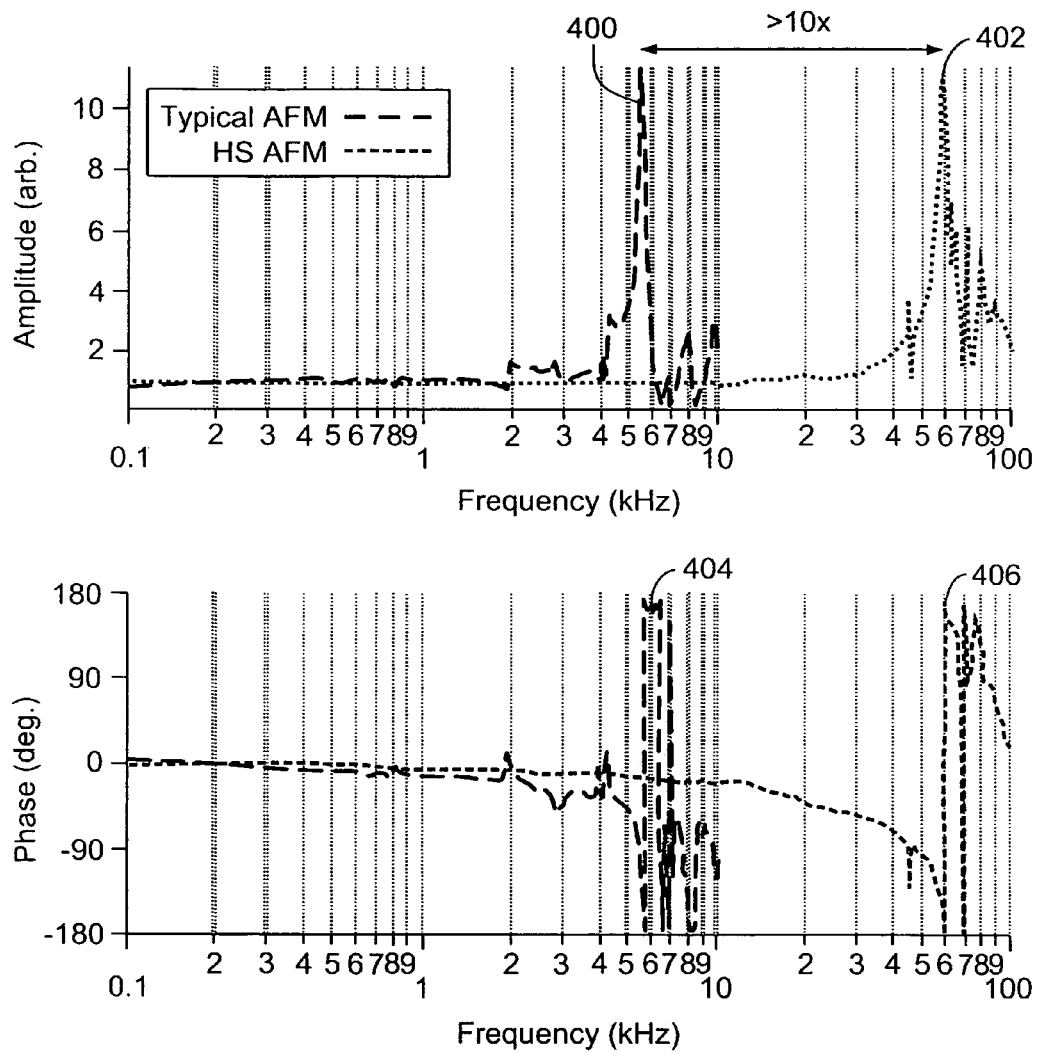
FIG. 18 is a graph illustrating Z-scanner dynamics associated with a prior art Z-scanner and a Z-scanner according to a preferred embodiment of the present invention.

Turning to FIG. 18, an illustration of Z-scanner dynamics is provided. In a conventional AFM, plots 400, 404 (amplitude/phase) of resonant frequency responses of the Z-scanner shows a first resonance at less than a single kilohertz. In contrast, in the AFM of the present preferred embodiments, which employ Z-scanner 110 coupled to fast scanning AFM head 100, Z-scanner dynamics (amplitude and phase plots 402, 406, respectively) exhibit a first resonant frequency greater than about 50 kilohertz. As a result, high speed scanning can be improved by a factor of twenty-five or more utilizing the preferred embodiments of the present invention.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A scanner for a scanning probe microscope (SPM) including a head, the scanner comprising:
   a scanner body housing an actuator and a sensor, the sensor detecting scanner movement; and
   wherein the scanner body is removable from the head by hand and without the use of tools and has a total volume of less than about five (5) square inches.

2. The scanner of claim 1, wherein the scanner is a Z-scanner providing motion of a probe device coupled thereto substantially only in a direction orthogonal to a sample being scanned.

3. The scanner of claim 2, further comprising a flexure diaphragm coupled between the actuator and the probe device that restricts motion of the probe device laterally relative to the direction.

4. The scanner of claim 1, wherein the sensor substantially measures motion of the probe device in the direction, and at least a portion of the sensor is supported by the body.

5. The scanner of claim 4, wherein the sensor includes a cantilevered element having fixed and free ends, and a link, and wherein one of the link is coupled to the free end of the cantilevered element, and an opposite end of the link is coupled to a probe holder supporting the probe device.

6. The scanner of claim 1, wherein the body is hermetically sealed to facilitate operation in fluid.

7. The scanner of claim 6, wherein the sensor further includes strain gauges disposed substantially at a fixed end of the cantilevered element.

8. The scanner of claim 1, wherein the body has a) a first open end for coupling the scanner to a free end portion of a head of the SPM, the free end portion having an outer surface and extending towards a sample, and b) a second closed end that supports a probe holder, and wherein the body has an inner surface extending between the first and second ends.

9. The scanner of claim 8, wherein the outer surface and the inner surface are similarly tapered so as to be mated to one another.

10. The scanner of claim 9, wherein an angle defined by the tapered inner surface is between about 15 degrees and 35 degrees.

11. The scanner of claim 1, wherein a fundamental resonant frequency associated with the scanner is greater than 10 kHz.

12. The scanner of claim 10, wherein the fundamental resonant frequency is greater than 40 kHz.

13. The scanner of claim 1, wherein the free end portion is a housing forming part of the head.

14. The scanner of claim 1, wherein the probe holder is rigidly coupled to the body.

15. The scanner of claim 8, wherein the inner surface includes an annular detent to accommodate a sealing element disposed in a groove in the outer surface.

16. The scanner of claim 8, further comprising a vacuum port in the free end portion that applies a vacuum force to the body.

17. The scanner of claim 16, wherein the vacuum port is coupled to a vacuum orifice in the free end portion, the vacuum orifice in the free end portion being connected to a vacuum orifice in the body.

18. The scanner of claim 1, further comprising at least one slot to receive an alignment pin supported by the head to orient a tip of the probe relative to the head.

19. A method of operating an atomic force microscope (AFM) having a head, the method comprising:
  providing a scanner including a body having a total volume less than about five square inches and supporting a probe device;
  attaching the scanner to the head by hand and without using tools; and
  operating the AFM.

20. The method of claim 18, further comprising directly sensing movement of the probe device with a sensor at least partly supported by the housing.

* * * * *

UNITED STATES PATENT AND TRADEMARK OFFICE
CERTIFICATE OF CORRECTION

PATENT NO.        : 8,474,060 B2                                      Page 1 of 1
APPLICATION NO.   : 13/068052
DATED             : June 25, 2013
INVENTOR(S)       : Phan et al.

It is certified that error appears in the above-identified patent and that said Letters Patent is hereby corrected as shown below:

In the Claims

Column 13, Claim 7, line 15 should depend from claim 5, not claim 6.

Column 14, Claim 12, line 1 should depend from claim 11, not claim 10.

Column 14, Claim 20, line 27 should depend from claim 19, not claim 18.

Signed and Sealed this
Twenty-second Day of July, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,474,060 B2 | Page 1 of 1 |
| APPLICATION NO. | : 13/068052 | |
| DATED | : June 25, 2013 | |
| INVENTOR(S) | : Phan et al. | |

It is certified that error appears in the above-identified patent and that said Letters Patent is hereby corrected as shown below:

On the title page item (57), in the Abstract, Line 5, replace "five (5) square inches" with -- five (5) cubic inches --.

In the claims,

In Claim 1, Column 12, Line 63, replace "five (5) square inches" with -- five (5) cubic inches --.

In Claim 19, Column 14, Line 23, "five square inches" with -- five (5) cubic inches --.

Signed and Sealed this
Twenty-ninth Day of December, 2015

Michelle K. Lee
*Director of the United States Patent and Trademark Office*